Patented Dec. 15, 1936

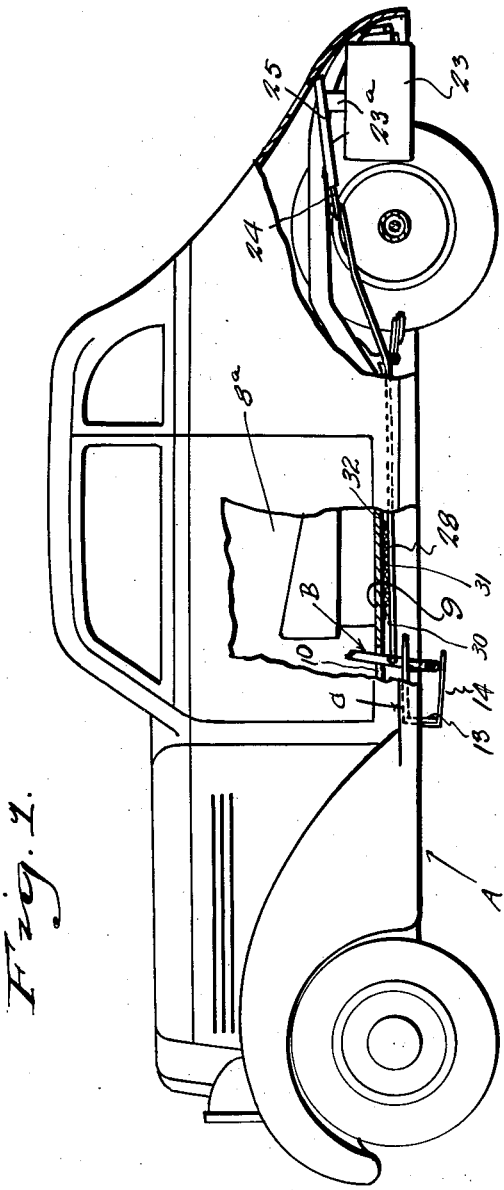
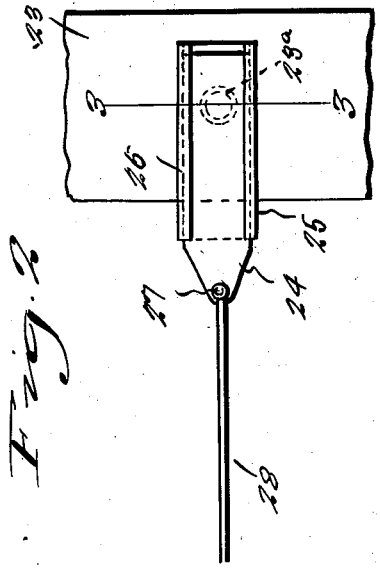
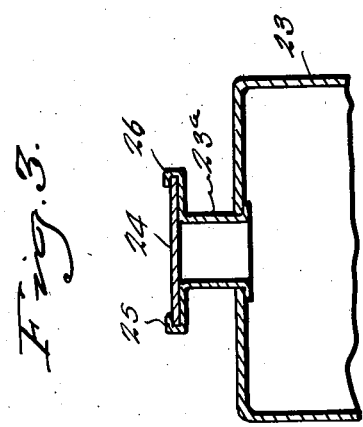

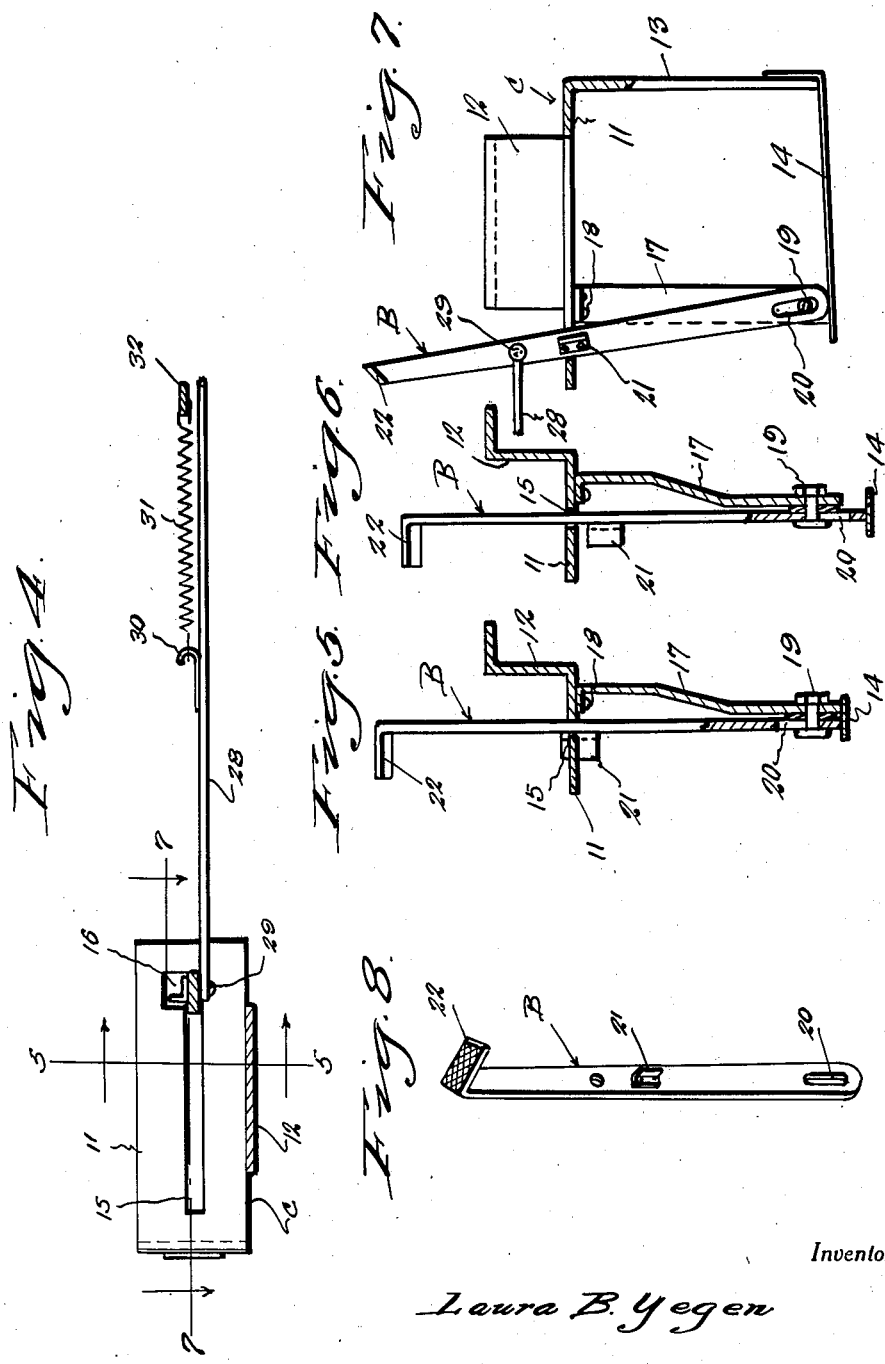

2,064,238

UNITED STATES PATENT OFFICE 2,064,238

LEVER LOCK FOR FUEL TANK CLOSURES ON AUTOMOBILES

Laura Bell Yegen, Billings, Mont.

Application November 12, 1935, Serial No. 49,390

2 Claims. (Cl. 220—55)

This invention relates to a lever lock for fuel tank closures on automobiles.

The primary object of the present invention is to construct a lever lock for installation in automobiles of the closed body types for controlling the closure on a fuel tank so as to prevent unauthorized withdrawal of the fuel from the storage tank when the doors of the body are locked.

Further objects of the present invention are to provide a device of the character referred to that is easily installed on all closed type bodies of automobiles without any material alteration thereof, that is very simple to manipulate from the driver's seat in the automobile, that is strong, compact, durable and fool proof, and that is comparatively inexpensive to manufacture and install.

With the foregoing and other objects in view the invention consists of a novel construction, combination and arrangement of parts as will be hereinafter more specifically described and illustrated in the accompanied drawings wherein is disclosed an embodiment of the invention but it is to be understood that changes, variations, and modifications may be resorted to without departing from the spirit of the claims hereunto appended.

In the drawings wherein like reference characters denote corresponding parts throughout the several views:—

Figure 1 is a side elevation of an automobile partly broken away and showing an adaptation therewith of the device in accordance with the present invention.

Figure 2 is a fragmentary top plan view of the fuel storage tank equipped with a sliding closure in accordance with the present invention.

Figure 3 is a detailed vertical section taken substantially on the plane of line 3—3 of Figure 2.

Figure 4 is a fragmentary top plan view of the device in accordance with the present invention having certain parts in horizontal section.

Figure 5 is a detailed vertical section taken substantially on the plane of line 5—5 of Figure 4 and showing the locking lever in projected and locked relation.

Figure 6 is a view similar to Figure 5 showing the locking lever in depressed relation in which position the lever may be rocked back and forth.

Figure 7 is a detailed vertical section taken substantially on the plane of line 7—7 of Figure 4.

Figure 8 is a prospective view of the locking lever removed from the supporting member.

Referring to the drawings in detail A indicates an automobile of the closed body type and 8a indicates the driver's compartment thereof. It is to be understood that the closed body of the automobile is equipped with doors that may be locked when the owner leaves the car standing thereby preventing unauthorized persons from gaining access to the driver's compartment 8a. As is customary in the construction of the automobiles there is a floor 9 in the driver's compartment and in the floor is a longitudinal slot 10 through which the upper portion of the locking lever indicated generally at B projects to a position so that it may be manipulated with ease from the driver's compartment. It will be understood that the locking lever B may be manipulated by the feet or by the hands.

The supporting member C has a horizontal plate portion 11 from the outer edge of which extends an upstanding flange 12 and this flange is adapted to be secured to the body of the automobile under the floor boards 9. From the forward end of the plate portion of member C there is a portion 13 depending at right angles to the plate portion 11. To the lower end of the portion 13 one end of a leaf spring 14 is secured in any suitable manner. The leaf spring 14 is substantially parallel with plate portion 11. The free end of the leaf spring 14 bears upon the lower end of the locking lever B as will hereafter appear.

There is an elongated slot 15 extending along the center of the horizontal portion 11 of the supporting member C. At the rear end of the slot 15 is a lateral notch 16 which registers therewith. The member C is supported on the body under the floor 9 so that the slot 15 registers with the slot 10 so as to permit the lever B to rock back and forth. The upper end of a bracket 17 is secured to the lower face of the horizontal portion 11 as at 18. The lower end of the bracket 17 carries the pivot bolt 19. The shank of the pivot bolt 19 rides in a slot 20 on the lower end of the locking lever B and the slot permits the lever to be projected and depressed from the operator's compartment of the automobile. On an intermediate portion of the locking lever B there is an outstanding lug 21 which in the projected or locked relation seats in the notch 16. When the lever is in the depressed or unlocked relation as shown in Figure 6 of the drawings the lug 21 is free of the notch and in this position the locking lever B may be rocked back and forth. In the depressed relation the lower end of the lever projects below the lower end of bracket 17 and bears on the spring which exerts an upward pressure on the lever. On the upper end of the locking lever B is a right-angled extension 22 which forms a handle or foot platform as the case may be.

As is customary with the conventional construction of automobiles a storage tank 23 is carried by the rear of the automobile. It very often happens that thieving persons will remove the cap of a storage tank and steal fuel. In the present invention the filling neck 23a is equipped with a sliding plate closure 24 that slides in guides 25, 26 formed on the filling neck. The forward end of the closure 24 is connected as at 27 to the rear end of a rigid link 28. The link 28 extends under the car and is bent to any desired shape to avoid rubbing or bearing on the parts of the automobile lying directly in its path. The forward end of the rigid link 28 is pivoted as at 29 to an intermediate portion of the locking lever B. To one side of link 28 is secured a hook 30. The one end of a coil spring 31 is connected to the hook 30 and the rear end thereof is secured to a bar 32 carried by the body. It will be seen that the spring 31 normally urges the locking lever B to the rear end of the slot 15. In this position a leaf spring 14 urges the lever upwardly whereupon the lug 21 seats in the notch 16 thereby normally holding the closure 24 in the closed position. To manipulate the locking lever B the hand or foot is pressed downwardly on extension 22 which movement depresses the lever against the action of leaf spring 14. In this latter position the lever is rocked forwardly which action causes the movement of the link 28 forwardly and results in the sliding of the closure 24 free of the filling neck 23a.

Having described my invention what I claim is:

1. The combination with an automobile characterized by a closed body and a fuel storage tank equipped with a filling neck having a sliding closure of a slotted supporting member adapted to be mounted on the body, said member also formed with a keeper notch registering with one end of the slot, a depressible lever pivotally carried by the member extending through said slot and being operable from the inside of the body to prevent unauthorized tampering with the lever when the body is locked, said lever having a lug secured thereto seatable in the keeper notch in the locked projected relation and releasable therefrom in the unlocked depressed relation, a spring connected with said member and bearing on the lever to normally retain the lever in projected relation, and a link connecting the lever with the sliding closure so that the rocking of the lever in the released relation opens and closes the filling neck.

2. The combination with an automobile characterized by a closed body and a fuel storage tank equipped with a filling neck having a sliding closure of a slotted supporting member adapted to be mounted on the body, said member also formed with a keeper notch registering with one end of the slot, a depressible lever pivotally carried by the member extending through said slot and being operable from the inside of the body to prevent unauthorized tampering with the lever when the body is locked, said lever having a lug secured thereto seatable in the keeper notch in the locked projected relation and releasable therefrom in the unlocked depressed relation, a spring connected with said member and bearing on the lever to normally retain the lever in projected relation, a link connecting the lever with the sliding closure so that the rocking of the lever in the released relation opens and closes the filling neck, and a spring connecting the body with the link for normally retaining the lever, link and closure in the locked closed relation.

LAURA B. YEGEN.